United States Patent
Rubel et al.

(10) Patent No.: US 7,263,913 B2
(45) Date of Patent: Sep. 4, 2007

(54) BIG AND BEARING SHELL

(75) Inventors: Herbert Rubel, Sincheim (DE); Werner Schubert, Wiesloch (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 268 days.

(21) Appl. No.: 10/450,303

(22) PCT Filed: Nov. 21, 2001

(86) PCT No.: PCT/EP01/13490

§ 371 (c)(1),
(2), (4) Date: Sep. 9, 2003

(87) PCT Pub. No.: WO02/48563

PCT Pub. Date: Jun. 20, 2002

(65) Prior Publication Data

US 2004/0048094 A1    Mar. 11, 2004

(30) Foreign Application Priority Data

Dec. 16, 2000   (DE) ................................ 100 62 876

(51) Int. Cl.
*F16C 9/04* (2006.01)
(52) U.S. Cl. ....................................................... 74/579
(58) Field of Classification Search .............. 74/579 R; 428/646, 645, 650
See application file for complete search history.

(56) References Cited

U.S. PATENT DOCUMENTS

| | | | |
|---|---|---|---|
| 5,093,207 A * | 3/1992 | Hodes et al. | 428/614 |
| 5,116,692 A | 5/1992 | Ishikawa | |
| 5,137,792 A * | 8/1992 | Hodes et al. | 428/614 |
| 5,300,368 A * | 4/1994 | Kubert et al. | 428/610 |
| 5,334,460 A | 8/1994 | Tanaka | |
| 5,939,215 A | 8/1999 | Andler | |
| 6,194,087 B1 * | 2/2001 | Huhn et al. | 428/646 |

FOREIGN PATENT DOCUMENTS

| | | |
|---|---|---|
| DE | 37 27 468 | 3/1989 |
| DE | 41 18 040 | 12/1992 |
| DE | 42 43 880 | 5/1999 |
| DE | 198 57 757 C | 2/2000 |
| JP | 62 315 371 | 6/1989 |
| JP | 03 299 256 | 8/1993 |
| JP | 05 043 023 | 9/1994 |
| JP | 06 081 727 | 11/1995 |
| JP | 09 290 778 | 5/1999 |

* cited by examiner

*Primary Examiner*—Vicky A. Johnson
(74) *Attorney, Agent, or Firm*—Paul Vincent

(57) ABSTRACT

The invention relates to a big end bearing shell (4, 6) for a connecting rod (2), consisting of titanium or a titanium alloy. The shell comprises a support layer (8, 20) consisting of steel and an anti-friction layer (16, 26) for the crankshaft. According to the invention, the back of the support layer (8, 20) is clad with a layer (10, 22) of tin bronze material, with a thickness of 10-50 μm to prevent fretting corrosion and frictional abrasion.

11 Claims, 2 Drawing Sheets

BIG AND BEARING SHELL

This application is the national stage of PCT/EP01/13490 filed on Nov. 21, 2001 and also claims Paris Convention priority to DE 100 62 876.1 filed on Dec. 16, 2000.

BACKGROUND OF THE INVENTION

The invention concerns a big end bearing shell for a connecting rod consisting of titanium or a titanium alloy, comprising a support layer of steel and an anti-friction layer for the crankshaft.

Mounting of big end bearing shells comprising a support layer of steel in the large opening of a titanium or titanium alloy connecting rod in motor vehicle engines, wherein the steel back of the support layer abuts the titanium surface of the connecting rod, produces fretting corrosion and frictional abrasion due to micro movements during operation of the engine.

It is the underlying purpose of the present invention to produce a big end bearing shell for a titanium or titanium alloy connecting rod which withstands the loads produced during operation and eliminates the above-described disadvantages.

SUMMARY OF THE INVENTION

This object is achieved in accordance with the invention with big end bearing shells of this type by cladding a layer of a tin bronze material having a thickness between 10 and 50 μm onto the back of the support layer, i.e. on the side of the support layer facing away from the anti-friction layer.

It has surprisingly turned out that the tin bronze layer which is preferably clad directly onto the support layer of steel, eliminates undesired fretting corrosion and frictional abrasion and thereby the accompanying wear and destruction of the connecting rod and of the bearing shells.

The tin bronze material is preferably a CuSn(4-8) alloy which is known per se from DIN 17662. The alloy may contain, in addition to copper and tin, up to 0.1% per weight of iron, up to 0.3% per weight of nickel, up to 0.05% per weight of Pb, up to 0.3% per weight of Zn and other impurities the total amount of which may not exceed 0.2% per weight.

It is assumed that the tin portion of the tin bronze material which is preferably directly clad onto the back of the support layer, achieves a higher corrosion resistance compared to e.g. a pure copper coating. Moreover, electro-plating of a copper coating is very demanding and time-consuming and application of the coating on one side only requires additional effort. It must also be expected that copper reacts with the aggressive components of modern engine oils and does not provide sufficient resistance.

The inventive use of a layer of a tin bronze material, preferably of the compound CuSn(4-8), in particular the alloy CuSn6, obtains excellent results for the engine operation. There are no problems with regard to fretting corrosion and frictional abrasion and the stability advantages of a steel/compound bearing material are utilized.

The anti-friction layer which cooperates with the surface of the crankshaft may be formed of a preferably clad aluminium-tin or an aluminium-zinc alloy. Preferred anti-friction layer alloys are AlZn(1-8) and AlSn(6-25), in particular AlSn(15-20).

An anti-friction layer of a sintered lead bronze layer has also proven to be particularly advantageous for a big end bearing shell. Preferred alloys are CuPb(9-17)Sn(2-11), in particular a CuPb20Sn2 and CuPb24Sn4 alloy.

In addition, it may be advantageous to dispose a so-called overlay coating, e.g. according to ISO 4383 onto the lead bronze layer. Electro-plated overlay layers from the alloys PbSn10Cu(1,5-7), in particular PbSn10Cu2 or PbSn10Cu6, which are preferably disposed onto a nickel blocking layer previously electro-plated onto the tin bronze layer have proven to be particularly advantageous. A sputtered overlay coating of AlSn20Cu(1-2) can also be used which is preferably also disposed onto a nickel-blocking layer.

The invention is particularly advantageous since tin bronze clad steel bands may be used for producing the big end bearing shells to greatly facilitate production of the inventive big end bearing shells. The invention therefore also concerns use of a tin bronze clad steel band with a tin bronze layer on one or both sides with a thickness between 10 and 50 μm for producing a big end bearing shell for a connecting rod of titanium or a titanium alloy with a support layer of a steel material and an anti-friction layer for the crankshaft, wherein the tin bronze clad steel band forms the support layer of the big end bearing shell and is coated with the anti-friction layer and subsequently divided into sections for forming the big end bearing shells, wherein the tin bronze clad side of the support layer forms the back of the bearing shell. The invention also concerns a titanium or titanium alloy connecting rod with big end bearing shells of the above-described type.

It is explicitly pointed out that steel bands may be used which are clad with tin bronze on both sides. A lead bronze layer may e.g. be directly deposited onto the clad tin bronze layer, preferably through sintering. Preferably, an anti-friction layer of an aluminium zinc alloy or an aluminium tin alloy is deposited, preferably clad, onto a steel band, which is clad on only one side with an intermediate pure aluminium layer.

Further features, details and advantages of the invention can be extracted from the accompanying claims and the drawing and the following description of a preferred embodiment of the invention.

DESCRIPTION OF THE PREFERRED EMBODIMENT

Figure 1:
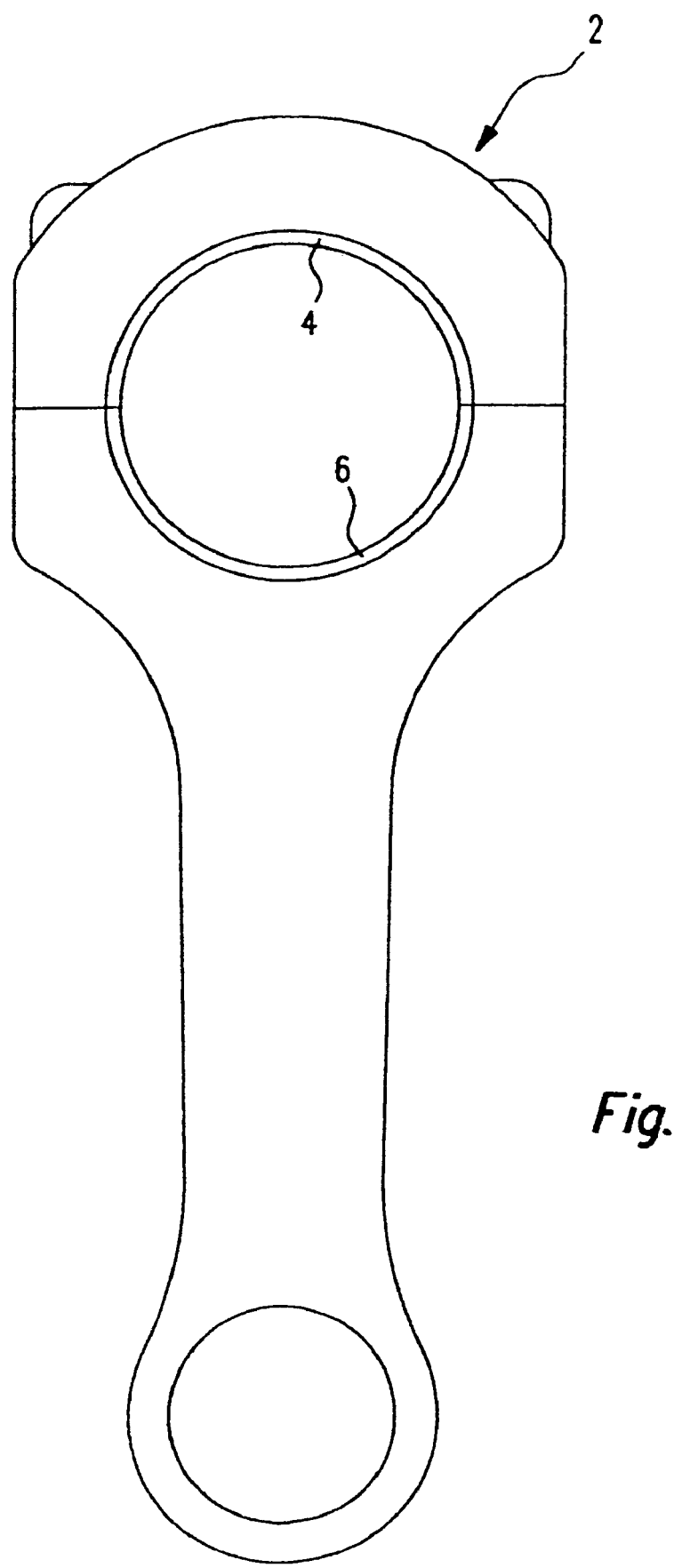
FIG. 1 shows an inventive connecting rod with inventive big end bearing shells in the large connecting rod eye.

FIG. 1 shows an inventive motor vehicle connecting rod 2 of titanium or a titanium alloy with big end bearing shells 4, 6, mounted in the large connecting rod eye, for bearing the connecting rod on the crankshaft (not shown) of an engine.

Figure 2:
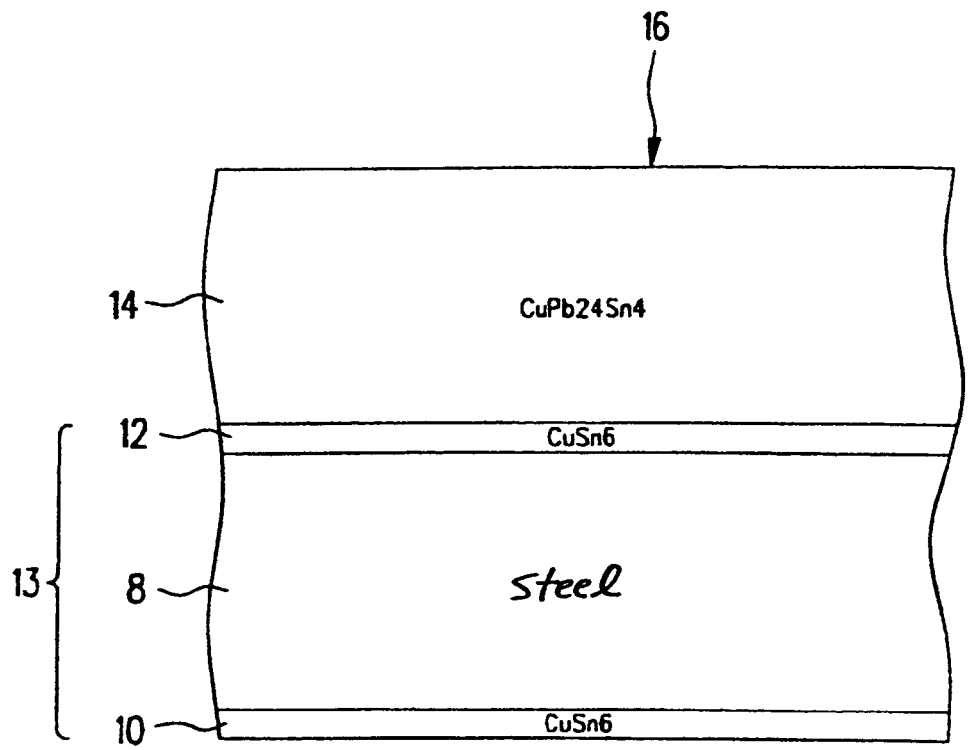
FIG. 2 shows a schematic partial sectional view through a big end bearing shell in accordance with a first embodiment of the invention.
Figure 3:
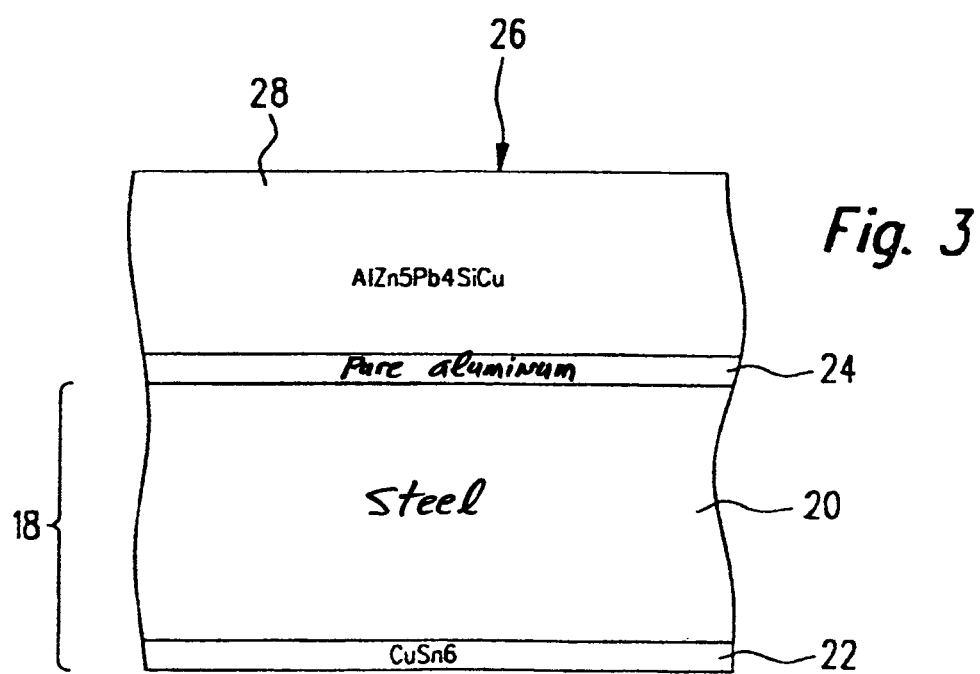
FIG. 3 shows a schematic partial sectional view through a big end bearing shell in accordance with a second embodiment of the invention.

FIGS. 2 and 3 show the construction of two inventive big end bearing shells which, like the big end bearing shells 4 and 6, may be used in a connecting rod of titanium or a titanium alloy without fretting corrosion or frictional abrasion.

The layered structure shown in FIG. 2 has a support layer 8 of steel onto each side of which a layer of a tin bronze material in the form of the alloy CuSn6 is clad.

This layered composite 8, 10, 12 is produced from an endless steel band 13 clad on both sides, as starting material. FIG. 2 shows a subsequently sintered lead bronze layer of a CuPb24 Sn4 alloy which forms the anti-friction layer 16 of the big end bearing shell. An overlay coating, e.g. in the form of the alloy PbSn10Cu2 is preferably disposed onto the anti-friction layer 16 thereby interposing a nickel blocking layer (not shown).

For producing the layered structure forming the inventive big end bearing shell in accordance with FIG. 2, the steel band 15 which is clad on both sides, was rolled and the anti-friction layer 16 was sintered thereon. The finished sintered and rolled layered structure (not to scale in FIG. 2) has a thickness of the anti-friction layer of 0.42 mm, a thickness of the tin bronze layers 10, 12 of 0.035 mm and a thickness of the steel support layer 8 of 1.02 mm. The hardness of the anti-friction layer surface 16 was 85 HB and the hardness of the steel support layer 8 (after removal of the tin bronze layer 10) was 163 HB.

In the structure of the inventive big end bearing shell shown in FIG. 3, a steel band 18 which was clad on one side with a tin bronze material was used which forms the support layer 20 of the big end bearing shell, wherein its roll-plated tin bronze layer 22 is again formed by a CuSn6 alloy. An anti-friction layer 26 of a clad AlZn5Pb4SiCu layer 28 is formed on the side of the support layer 20 opposite the tin bronze layer thereby interposing a pure aluminium layer 24. To produce such a layered structure for forming an inventive big end bearing shell, the initial material could have been a steel band clad on both sides whose clad tin bronze layer was then removed from one side.

We claim:

1. A big end bearing shell structured and dimensioned for a titanium or a titanium alloy connecting rod, the bearing shell comprising:

a support layer made from a steel material, said support layer having a first side and a second side;

an anti-friction layer for the crankshaft, said anti-friction layer disposed at said first side of said support layer; and a layer of tin bronze material having a thickness between 10 and 50 μm, clad onto said second side of said support layer.

2. The big end bearing shell of claim 1, wherein said tin bronze material comprises a CuSn(4-8) alloy.

3. The big end bearing shell of claim 1, wherein said anti-friction layer is one of a clad aluminium tin alloy and a clad aluminiuim zinc alloy.

4. The big end bearing shell of claim 3, wherein said anti-friction layer is an AlZn(1-8) alloy.

5. The big end bearing shell of claim 3, wherein said anti-friction layer is an AlSn(6-25) alloy.

6. The big end bearing shell of claim 5, wherein said aluminium tin alloy is an AlSn(15-21) alloy.

7. The big end bearing shell of claim 1, wherein said anti-friction layer is formed from a sintered lead bronze layer.

8. The big end bearing shell of claim 7, wherein said lead bronze is a CuPb(9-27)Sn(2-11) alloy.

9. The big end bearing shell of claim 7, further comprising an overlay coating disposed onto said lead bronze layer.

10. The big end bearing shell of claim 7, further comprising a layer of tin bronze material clad onto said support layer between said lead bronze layer and said support layer.

11. Use of the big end bearing shell of claim 1 in a titanium or a titanium alloy connecting rod.

* * * * *